United States Patent
Sun et al.

(10) Patent No.: US 12,068,981 B2
(45) Date of Patent: Aug. 20, 2024

(54) OPERATION MODES FOR HIGH SPEED TRAIN ENHANCEMENTS

(71) Applicant: APPLE INC., Cupertino, CA (US)

(72) Inventors: Haitong Sun, Cupertino, CA (US); Chunxuan Ye, San Diego, CA (US); Dawei Zhang, Cupertino, CA (US); Hong He, Cupertino, CA (US); Jie Cui, Cupertino, CA (US); Sigen Ye, San Diego, CA (US); Wei Zeng, Cupertino, CA (US); Weidong Yang, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,364

(22) PCT Filed: Aug. 5, 2021

(86) PCT No.: PCT/CN2021/111032
§ 371 (c)(1),
(2) Date: Sep. 16, 2021

(87) PCT Pub. No.: WO2023/010468
PCT Pub. Date: Feb. 9, 2023

(65) Prior Publication Data
US 2024/0014957 A1 Jan. 11, 2024

(51) Int. Cl.
*H04L 12/28* (2006.01)
*H04L 5/00* (2006.01)
(52) U.S. Cl.
CPC .......... *H04L 5/0035* (2013.01); *H04L 5/0053* (2013.01); *H04L 5/0094* (2013.01)
(58) Field of Classification Search
CPC ........................... H04L 5/0053; H04L 5/0094
(Continued)

(56) References Cited

U.S. PATENT DOCUMENTS

| 2013/0143503 | A1* | 6/2013 | Li | H04W 24/02 |
| | | | | 455/63.1 |
| 2018/0330611 | A1* | 11/2018 | Jiang | H04W 36/324 |
| 2023/0198723 | A1* | 6/2023 | Sun | H04B 7/088 |
| | | | | 370/329 |

FOREIGN PATENT DOCUMENTS

| CN | 102045094 A | 5/2011 |
| CN | 106302270 A | 1/2017 |

(Continued)

OTHER PUBLICATIONS

PCT/CN2021/111032 , International Search Report and Written Opinion, Apr. 25, 2022, 10 pages.

(Continued)

*Primary Examiner* — Dang T Ton
(74) *Attorney, Agent, or Firm* — Dorsey & Whitney LLP

(57) ABSTRACT

Supporting high speed train (HST) schemes at a user equipment (UE) may include, in response to being within range of a transmission and reception point (TRP) of a plurality of TRPs associated with an HST, decoding a communication received from a network. The communication may include an HST scheme configuration. The HST scheme configuration may include an HST-single frequency network (HST-SFN) without network pre-compensation scheme and an HST-SFN with network pre-compensation scheme. At least one of a channel restriction and an environmental restriction associated with the HST scheme configuration may be identified. Based on the at least one of the channel restriction and the environmental restriction, the HST scheme configuration may be applied.

13 Claims, 5 Drawing Sheets

(58) Field of Classification Search
USPC .............................. 370/329, 400, 401, 405
See application file for complete search history.

(56) References Cited

FOREIGN PATENT DOCUMENTS

| | | |
|---|---|---|
| JP | 2005051724 A | 2/2005 |
| WO | 2017194008 A1 | 11/2017 |

OTHER PUBLICATIONS

Qualcomm Incorporated, "Enhancements on HST-SFN deployment", R1-2104657, 3GPP TSG-RAN WG1 Meeting #104bis-e, e-Meeting, Agenda Item 8.1.2.4, May 10-27, 2021, 46 pages.
Vivo, "Further discussion and evaluation on HST-SFN transmission schemes", R1-2104346, 3GPP TSG RAN WG1 #105-e, e-Meeting, Agenda Item 8.1.2.4, May 10-27, 2021, 15 pages.

* cited by examiner

OPERATION MODES FOR HIGH SPEED TRAIN ENHANCEMENTS

TECHNICAL FIELD

This application relates generally to wireless communication systems, including High Speed Train (HST) operating mode enhancements.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi©).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
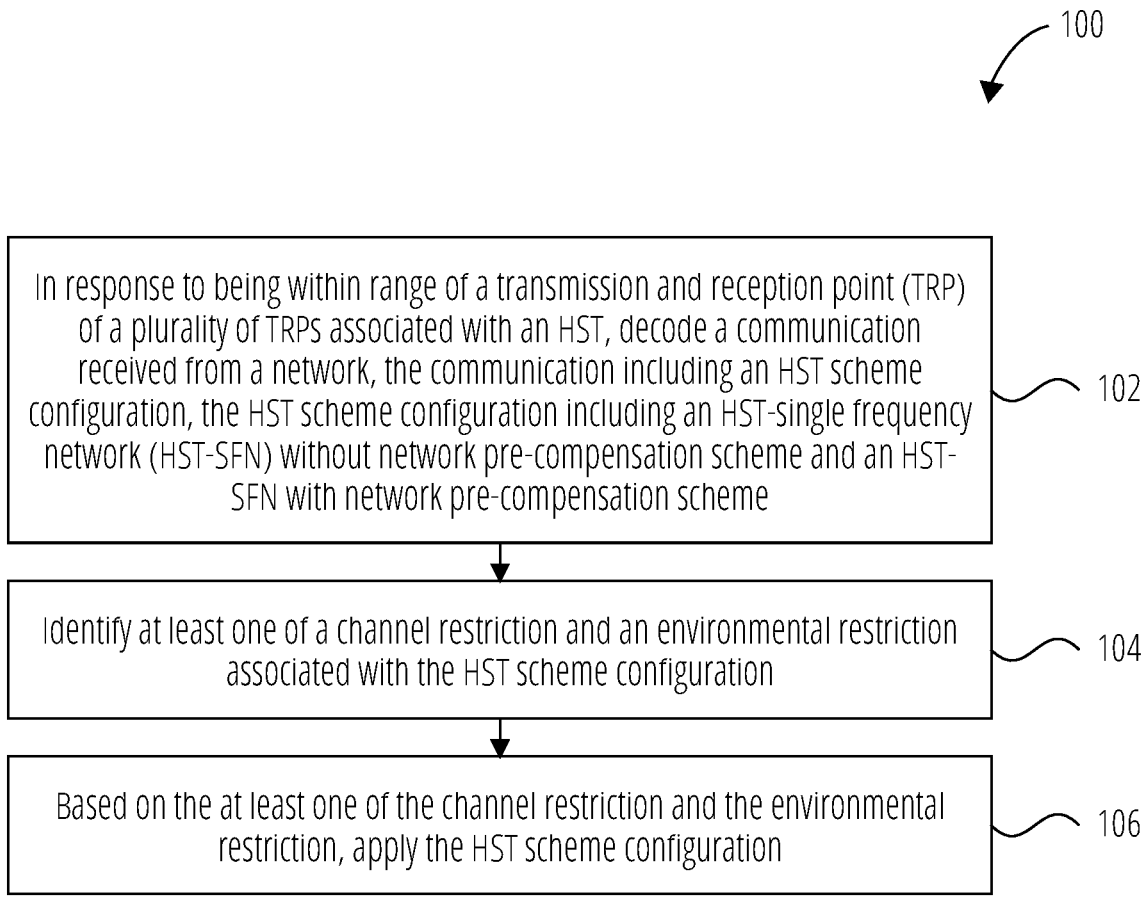
FIG. 1 illustrates a flowchart of a method for supporting high speed train (HST) schemes at a user equipment (UE), in accordance with some embodiments.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

High Speed Train (HST) deployment scenarios provide a unique wireless environment. In particular, when a UE (e.g., a train or a mobile device of a user on a train) travels between two transmission/reception point (TRP) in HST scenarios, the UE may observe a very high positive Doppler shift from a first TRP and very high negative Doppler shift from a second TRP. As a result, the composite channel can vary quickly (e.g., approximately, or more than, 2 kilohertz (kHz)). Such scenarios may reduce channel capacity or present challenges for a UE when trying to perform accurate channel estimation.

Currently, in 3GPP Release 17 (Rel-17), two modes of HST enhancement based on a Single Frequency Network (SFN) transmission are supported. The first mode comprises an HST-SFN without network (NW) pre-compensation. In such mode, physical downlink shared channel (PDSCH)/physical downlink control channel (PDCCH) (i.e., control resource set (CORESET)) is configured to quasi-co-locate (QCL) to two Tracking Resource Signals (TRSs). In addition, such mode may allow a UE to estimate two separate Doppler shift (i.e., one from each TRP) to assist in UE channel estimation. The second mode comprises HST-SFN with NW pre-compensation. In such mode, one PDSCH is configured to QCL with a "Doppler shift" property to one TRS and QCL without a "Doppler shift" property to the other TRS.

In general, HST enhancements are part of a multi-TRP operation enhancement. Currently, the following different operation modes are supported in NR with single downlink control information (DCI): 1. 3GPP Release 15 (Rel-15) single-TRP operation; 2. 3GPP Release 16 (Rel-16) single-DCI multi-TRP scheme 1a (Spatial Domain Multiplexing (SDM)); 3. Rel-16 single-DCI multi-TRP frequency domain multiplexing (FDM) Scheme A (FDMSchemeA); 4. Rel-16 single-DCI multi-TRP FDMSchemeB; 5. Rel-16 single-DCI multi-TRP time division multiplexing (TDM) Scheme A (TDMSchemeA); 6. Rel-16 single-DCI multi-TRP scheme 4 (inter-slot TDM); 7. 3GPP Release 17 (Rel-17) HST-SFN scheme 1 (without pre-compensation); and 8. Rel-17 HST-SFN pre-compensation.

The principles described herein provide solutions for handling different TRP operation modes corresponding to an HST enhancement. For instance, the solutions described herein address at least: 1. Different HST-SFN modes; 2.

HST-SFN mode and Rel-15 single-TRP operation; and 3. HST-SFN and other Rel-16 single-DCI multi-TRP modes.

As briefly described above, Rel-17 will support two HST-SFN modes, including: Rel-17 HST-SFN scheme 1, which does not have NW Doppler shift pre-compensation. This mode is to be supported for both the PDSCH and PDCCH; and 2. Rel-17 HST-SFN pre-compensation, which includes a pre-compensation NW Doppler shift. Currently, support is limited to PDSCH, but could come later for PDCCH.

The first solution is related to switching between different HST-SFN modes and has a number of options and sub-options. In a first option corresponding to switching between the two HST-SFN modes and PDSCH operation, a UE may be configured with at most one of the two HST-SFN modes (i.e., either HST-SFN scheme 1 or HST-SFN pre-compensation), with the following sub-options: 1. Such restriction is per UE such that a UE is not expected to operate in different HST-SFN modes for PDSCH operation across all component carriers (CCs); 2. Such restriction is per CC such that a UE is not expected to operate in different HST-SFN modes for PDSCH operation within different bandwidth parts (BWPs) of a CC. In other words, a UE may operate in a single HST-SFN mode for PDSCH operation with respect to any given CC (e.g., in a first CC, HST-SFN scheme 1-only is expected of a UE while in a second CC, HST-SFN pre-compensation-only is expected of the UE); or 3. Such restriction is per BWP such that a UE is not expected to operate in different HST-SFN modes for PDSCH operation within a given BWP of a CC. In such embodiments, a NW can use a BWP switch to change an HST-SFN mode for PDSCH operation within a CC.

In a second option related to switching between the two different HST-SFN modes and PDCCH operation, in all CORESETs, a UE may be configured with a single one of the two HST-SFN modes (i.e., either HST-SFN scheme 1 or HST-SFN pre-compensation), with the following sub-options: 1. Such restriction is per UE such that a UE is not expected to operate in different HST-SFN modes for PDCCH operation across all CCs; 2. Such restriction is per CC such that a UE is not expected to operate in different HST-SFN modes for PDCCH operation within different BWPs of a CC. In other words, a UE may operate in a single HST-SFN mode for PDCCH operation with respect to any given CC (e.g., in a first CC, HST-SFN scheme 1-only is expected of a UE while in a second CC, HST-SFN pre-compensation-only is expected of the UE); or 3. Such restriction is per BWP such that a UE is not expected to operate in different HST-SFN mode for PDCCH operation within a BWP of a CC. In such embodiments, a NW can use a BWP switch to change an HST-SFN mode for PDCCH operation within a CC.

In a third option related to switching between the two different HST-SFN modes and both PDSCH and PDCCH operation, a UE may be configured with a single one of the two HST-SFN modes (i.e., either HST-SFN scheme 1 or HST-SFN pre-compensation), with the following sub-options: 1. Such restriction is per UE such that a UE is not expected to operate in different HST-SFN modes for PDSCH and PDCCH operation across all CCs. If either HST-SFN scheme 1 or the pre-compensation mode is used, the other scheme may not be used for any PDSCH or PDCCH operation in any CC; 2. Such restriction is per CC such that a UE is not expected to operate in different HST-SFN modes for PDSCH and PDCCH operation within different BWPs of a CC. In other words, a UE may operate in a single HST-SFN mode for PDSCH and PDCCH operation with respect to any given CC (e.g., in a first CC, HST-SFN scheme 1-only is expected of a UE while in a second CC, HST-SFN pre-compensation-only is expected of the UE); or 3. Such restriction is per BWP such that a UE is not expected to operate in different HST-SFN mode for PDSCH and PDCCH operation within a BWP of a CC. In such embodiments, a NW can use a BWP switch to change an HST-SFN mode for PDSCH and PDCCH operation within a CC.

The second solution is related to switching between the HST-SFN modes/schemes and Rel-15 single-TRP operation, and has a number of options and sub-options. In a first option, HST-SFN and Rel-15 single-TRP operation may not be configured simultaneously for PDSCH and PDCCH operation (e.g., a given UE does not support dynamic switching between one of the HST-SFN schemes and a Rel-15 Single-TRP scheme).

For PDSCH operation in the first option of the second solution, a UE may be configured with a single one of the HST-SFN modes (i.e., HST-SFN scheme 1 and HST-SFN pre-compensation) or single-TRP operation, with the following sub-options: 1. Such restriction is per UE such that a UE is not expected to operate in both the HST-SFN mode and Rel-15 single-TRP operation for PDSCH operation across all component carriers (CCs); 2. Such restriction is per CC such that a UE is not expected to operate in both the HST-SFN mode and Rel-15 single-TRP operation for PDSCH operation within different bandwidth parts (BWPs) of a CC. In other words, a UE may operate in the HST-SFN mode or Rel-15 single-TRP operation for PDSCH operation with respect to any given CC (e.g., in a first CC, the HST-SFN mode-only is expected of a UE while in a second CC, single-TRP operation is expected of the UE); or 3. Such restriction is per BWP such that a UE is not expected to operate in both the HST-SFN mode and Rel-15 single-TRP operation for PDSCH operation within a BWP of a CC. In such embodiments, a NW can use a BWP switch to change a mode/operation for PDSCH operation within a CC.

For PDCCH operation in the first option of the second solution, in all CORESETs, a UE may be configured with a single one of the HST-SFN modes or single-TRP operation, with the following sub-options: 1. Such restriction is per UE such that a UE is not expected to operate in both the HST-SFN mode and single-TRP operation for PDCCH operation across all CCs; 2. Such restriction is per CC such that a UE is not expected to operate in both the HST-SFN mode and single-TRP operation for PDCCH operation within different BWPs of a CC. In other words, a UE may operate in either the HST-SFN mode or single-TRP operation for PDCCH operation with respect to any given CC (e.g., in a first CC, the HST-SFN mode-only is expected of a UE while in a second CC, single-TRP operation-only is expected of the UE); or 3. Such restriction is per BWP such that a UE is not expected to operate in both the HST-SFN mode and single-TRP operation for PDCCH operation within a BWP of a CC. In such embodiments, a NW can use a BWP switch to change a mode/operation for PDCCH operation within a CC.

For PDSCH and PDCCH operation in the first option of the second solution, in all CORESETs and for all PDSCH, a UE may be configured with a single one of the HST-SFN modes or single-TRP operation, with the following sub-options: 1. Such restriction is per UE such that a UE is not expected to operate in both the HST-SFN mode and single-TRP operation for PDSCH and PDCCH operation across all CCs. If either the HST-SFN mode or single-TRP operation is used, the other scheme may not be used for any PDSCH or PDCCH operation in any CC; 2. Such restriction is per CC such that a UE is not expected to operate in both the HST-SFN mode and single-TRP operation for PDSCH and PDCCH operation within different BWPs of a CC. In other words, a UE may operate in either the HST-SFN mode or single-TRP operation for PDSCH and PDCCH operation with respect to any given CC (e.g., in a first CC, the HST-SFN mode-only is expected of a UE while in a second CC, the single-TRP operation-only is expected of the UE); or 3. Such restriction is per BWP such that a UE is not expected to operate in both the HST-SFN mode and single-TRP operation for PDSCH and PDCCH operation within a BWP of a CC. In such embodiments, a NW can use a BWP switch to change a mode/operation for PDSCH and PDCCH operation within a CC.

In a second option of the second solution, for PDCCH operation, in terms of the configuration of the HST-SFN mode and Rel-15 Single-TRP operation, the following two sets of DCI may apply: 1. A first set may comprise a Fallback DCI (DCI Format 00, 11), and a Special DCI (DCI Format 2_0/1/2/3/4/5/6); and 2. A second set may comprise a Non-Fallback DCI (DCI Format 0_1, 0_2, 1_1, 1_2).

With respect to the two sets of DCI described above, the following options may apply: 1. Within a set of DCI, different HST-SFN modes and Rel-15 single-TRP operation can be configured; or 2. Within a set of DCI, the same HST-SFN mode or Rel-15 single-TRP operation is to be configured. The second option, however, may include a different HST-SFN mode and Rel-15 single-TRP operation being configured for different sets. Notably, similar restrictions to those described above with respect to various embodiments may also apply (i.e., such restrictions may be per UE across all the CCs; such restrictions may be per CC; and such restrictions may be per BWP).

In a third option of the second solution, for PDCCH operation, in an active BWP of a given CC, when two CORESETs overlap in the frequency domain, the two CORESETs may not be configured with different modes (i.e., either both CORESETs operate in single-TRP mode, or, both CORESETs operate in the same HST-SFN mode/enhancement scheme).

In a fourth option of the second solution, for PDCCH operation, when multiple CORESETs are configured, in terms of the configuration of HST-SFN and Rel-15 single-TRP operation, the following options may apply: 1. Within all CORESETs, different HST-SFN schemes and Rel-15 single-TRP operation can be configured for different CORESETs; or 2. Within all CORESETs, the same HST-SFN scheme or Rel-15 single-TRP operation is to be configured. Once again, similar restrictions to those described above with respect to various embodiments may also apply (i.e., such restrictions may be per UE across all the CCs; such restrictions may be per CC; and such restrictions may be per BWP).

In a fifth option of the second solution, for PDSCH operation, when a UE indicates that the UE does not support dynamic switching between HST-SFN modes and Single-TRP operation, the NW may not use a medium access control-control element (MAC-CE) to activate a TCI codepoint with a single TCI state and/or a TCI codepoint with two TCI states. Once again, similar restrictions to those described above with respect to various embodiments may also apply (i.e., such restrictions may be per UE across all the CCs; such restrictions may be per CC; and such restrictions may be per BWP).

In a sixth option of the second solution, for PDCCH and PDSCH operation, the following options may apply: 1. HST-SFN PDCCH schedules HST-SFN PDSCH; and 2. Single-TRP PDCCH schedules single-TRP PDSCH; 3. HST-SFN PDCCH schedules Single-TRP PDSCH (may always apply in some embodiments); and 4. Single-TRP PDCCH schedules HST-SFN PDSCH (may always apply in some embodiments). In addition, options 3 and 4 may be applied independently in some embodiments and not independently in others.

In a third solution related to switching between an HST-SFN scheme and other Rel-16 single-DCI multi-TRP modes/schemes, for PDSCH and PDCCH operation, the following may apply: 1. The PDCCH (CORESET) is configured in an HST-SFN mode and schedules PDSCH; and 2. The PDSCH is configured in other Rel-16 single-DCI multi-TRP modes. In addition, the following options may apply: a. Single-TRP PDCCH is to schedule a PDSCH configured in other Rel-16 single-DCI multi-TRP modes (i.e., the combination of 1 and 2 may not be allowed); or b. The combination of 1 and 2 may be allowed. In such embodiments, a UE may report whether the UE supports such a combination via UE capability reporting. Notably, option a or option b may be different for different Rel-16 single-DCI multi-TRP modes. In addition, Rel-16 single-DCI multi-TRP scheme 1a can be separated from other Rel-16 Single-DCI Multi-TRP modes (i.e., FDMSchemeA, FDMSchemeB, TDMSchemeA and scheme 4).

FIG. 1 illustrates a flowchart of a method 100 for switching between the two different HST schemes. In 102, the method 100, in response to being within range of a transmission and reception point (TRP) of a plurality of TRPs associated with an HST, decodes a communication received from a network. The communication may include an HST scheme configuration that includes an HST-single frequency network (HST-SFN) without network pre-compensation scheme and an HST-SFN with network pre-compensation scheme.

In 104, the method 100 identifies at least one of a channel restriction and an environmental restriction associated with the HST scheme configuration. For instance, a channel restriction may be related to one or both of PDSCH and PDCCH and the environmental restriction may be related to restrictions on the number of schemes to be used by the UE with respect to all CCs, with respect to particular CCs, and with respect to BWPs within a CC. In 106, the method 100, based on the at least one of the channel restriction and the environmental restriction, applies the HST scheme configuration. For instance, a particular scheme (e.g., the HST-single frequency network (HST-SFN) without network pre-compensation scheme) may be utilized based at least partially on the channel restrictions and/or the environmental restrictions described above.

Figure 2:
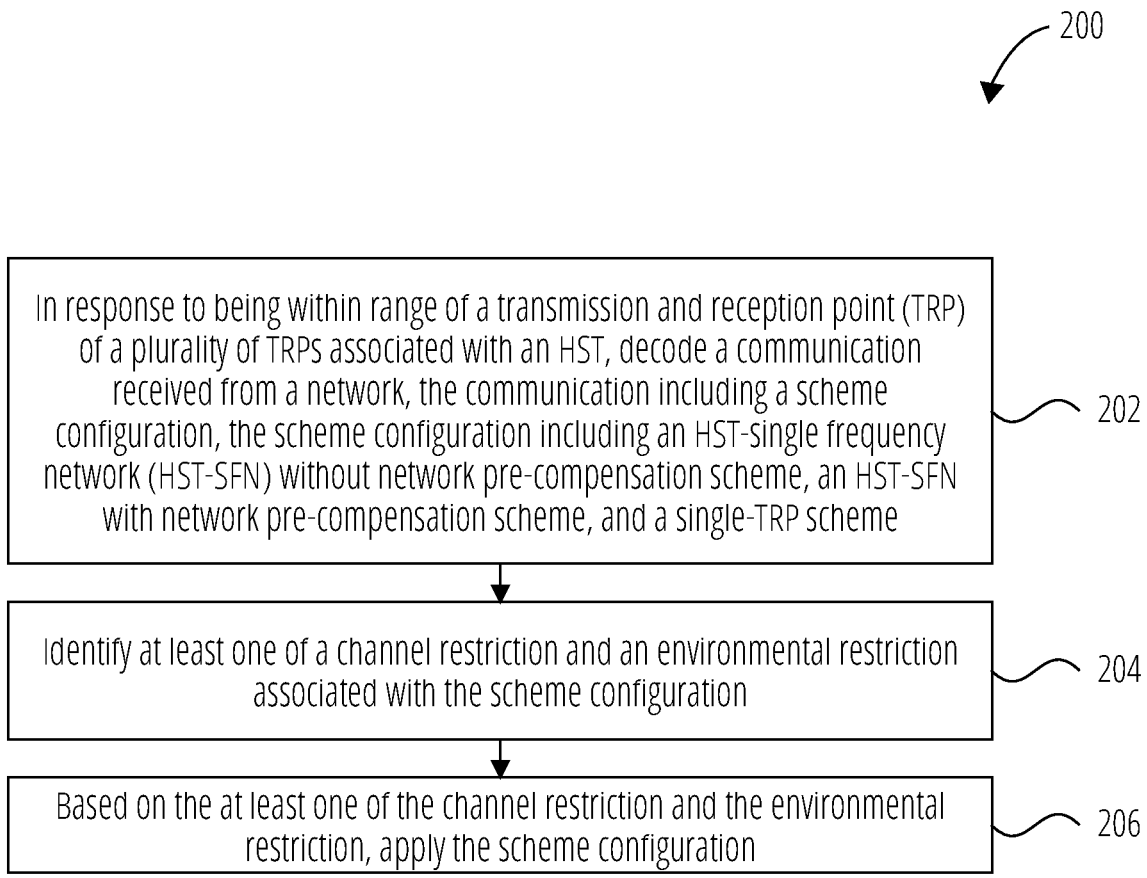
FIG. 2 illustrates a flowchart of a method for supporting high speed train (HST) schemes at a user equipment (UE), in accordance with some embodiments.

FIG. 2 illustrates a flowchart of a method 200 for switching between one of the HST schemes and a single-TRP scheme. In 202, the method 200, in response to being within range of a transmission and reception point (TRP) of a plurality of TRPs associated with an HST, decodes a communication received from a network. The communication may include a scheme configuration that includes an HST-single frequency network (HST-SFN) without network pre-compensation scheme, an HST-SFN with network pre-compensation scheme, and a single-TRP scheme.

In 204, the method 200 identifies at least one of a channel restriction and an environmental restriction associated with the scheme configuration. For instance, a channel restriction may be related to one or both of PDSCH and PDCCH and the environmental restriction may be related to restrictions on the number of schemes to be used by the UE with respect to all CCs, with respect to particular CCs, and with respect to BWPs within a CC. In 206, the method 200 based on the at least one of the channel restriction and the environmental restriction, applies the scheme configuration. For instance, a particular scheme (e.g., the HST-single frequency network (HST-SFN) without network pre-compensation scheme) may be utilized based at least partially on the channel restrictions and/or the environmental restrictions described above.

Figure 3:
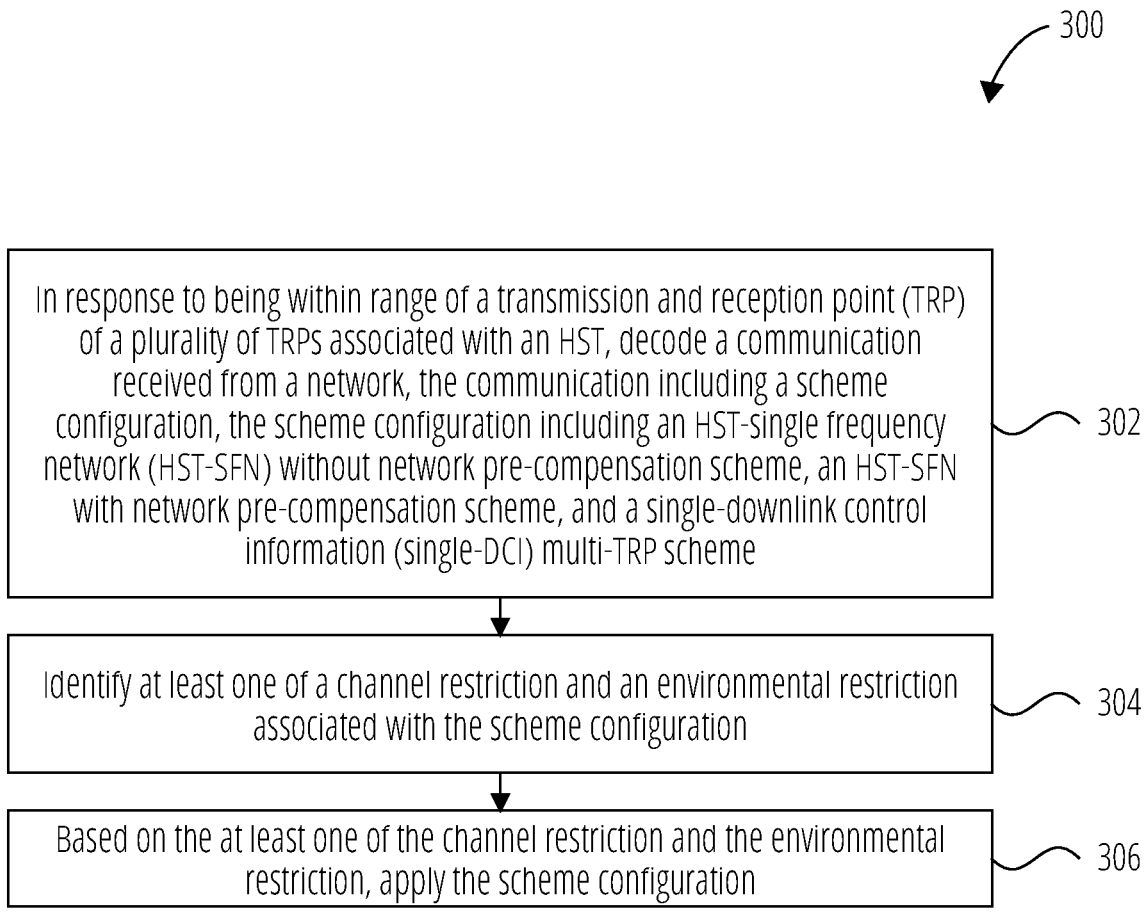
FIG. 3 illustrates a flowchart of a method for supporting high speed train (HST) schemes at a user equipment (UE), in accordance with some embodiments.

FIG. 3 illustrates a flowchart of a method 300 for switching between one of the HST schemes and a single-DCI multi-TRP scheme. In 302, the method 300, in response to being within range of a transmission and reception point (TRP) of a plurality of TRPs associated with an HST, decodes a communication received from a network. The communication may include a scheme configuration that includes an HST-single frequency network (HST-SFN) without network pre-compensation scheme, an HST-SFN with network pre-compensation scheme, and a single-downlink control information (single-DCI) multi-TRP scheme.

In 304, the method 300 identifies at least one of a channel restriction and an environmental restriction associated with the scheme configuration. For instance, a channel restriction may be related to one or both of PDSCH and PDCCH and the environmental restriction may be related to restrictions on the number of schemes to be used by the UE with respect to all CCs, with respect to particular CCs, and with respect to BWPs within a CC. In 306, the method 300 based on the at least one of the channel restriction and the environmental restriction, applies the scheme configuration. For instance, a particular scheme (e.g., the HST-single frequency network (HST-SFN) without network pre-compensation scheme) may be utilized based at least partially on the channel restrictions and/or the environmental restrictions described above.

Embodiments contemplated herein include an apparatus comprising means to perform one or more elements of the method 100, the method 200, and the method 300. This apparatus may be, for example, an apparatus of a UE (such as a wireless device 502 that is a UE, as described herein).

Embodiments contemplated herein include one or more non-transitory computer-readable media comprising instructions to cause an electronic device, upon execution of the instructions by one or more processors of the electronic device, to perform one or more elements of the method 100, the method 200, and the method 300. This non-transitory computer-readable media may be, for example, a memory of a UE (such as a memory 506 of a wireless device 502 that is a UE, as described herein).

Embodiments contemplated herein include an apparatus comprising logic, modules, or circuitry to perform one or more elements of the method 100, the method 200, and the method 300. This apparatus may be, for example, an apparatus of a UE (such as a wireless device 502 that is a UE, as described herein).

Embodiments contemplated herein include an apparatus comprising: one or more processors and one or more computer-readable media comprising instructions that, when executed by the one or more processors, cause the one or more processors to perform one or more elements of the method 100, the method 200, and the method 300. This apparatus may be, for example, an apparatus of a UE (such as a wireless device 502 that is a UE, as described herein).

Embodiments contemplated herein include a signal as described in or related to one or more elements of the method 100, the method 200, and the method 300.

Embodiments contemplated herein include a computer program or computer program product comprising instructions, wherein execution of the program by a processor is to cause the processor to carry out one or more elements of the method 100, the method 200, and the method 300. The processor may be a processor of a UE (such as a processor(s) 504 of a wireless device 502 that is a UE, as described herein). These instructions may be, for example, located in the processor and/or on a memory of the UE (such as a memory 506 of a wireless device 502 that is a UE, as described herein).

Figure 4:
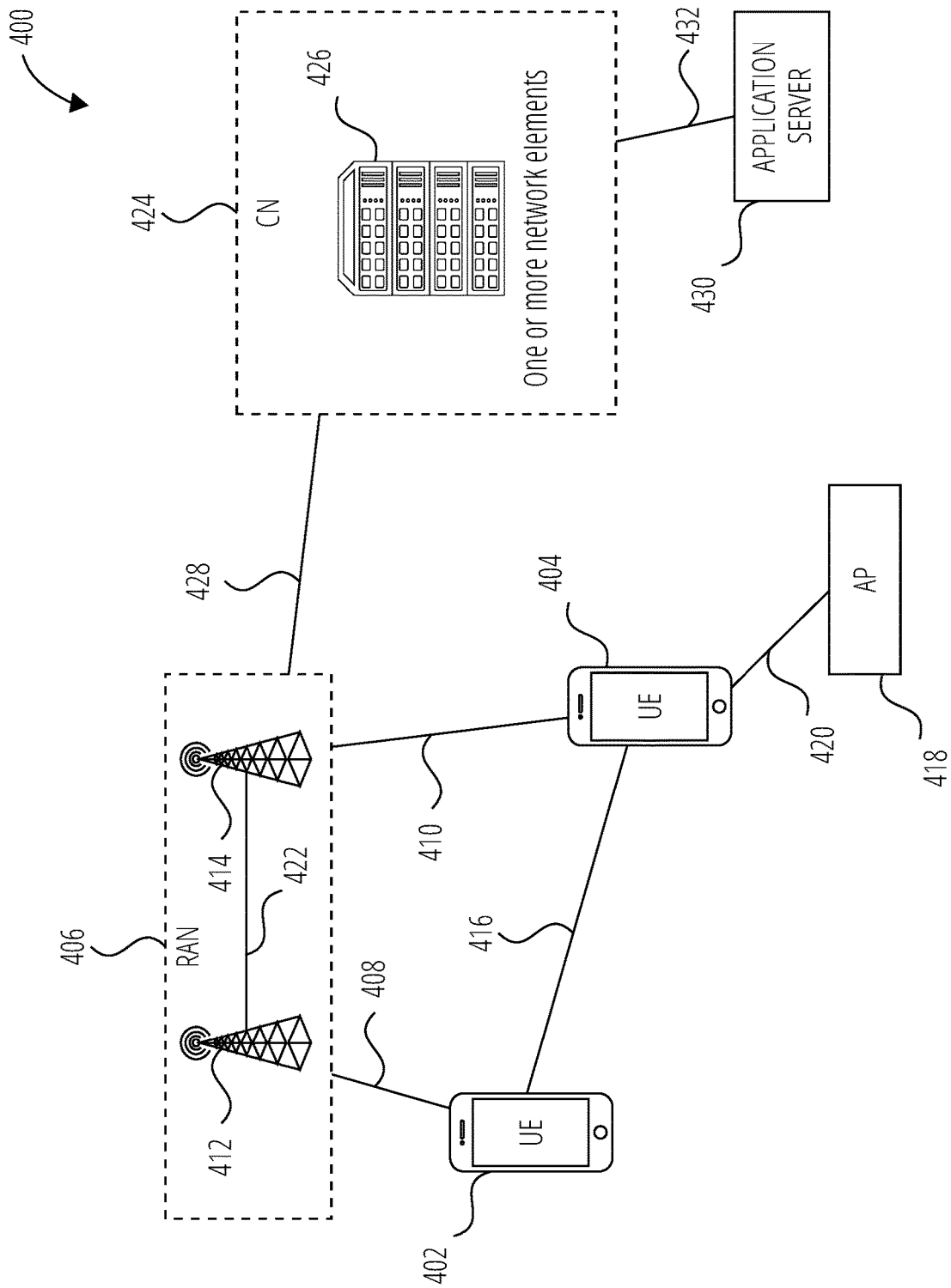
FIG. 4 illustrates an example architecture of a wireless communication system, according to embodiments disclosed herein.

FIG. 4 illustrates an example architecture of a wireless communication system 400, according to embodiments disclosed herein. The following description is provided for an example wireless communication system 400 that operates in conjunction with the LTE system standards and/or 5G or NR system standards as provided by 3GPP technical specifications.

As shown by FIG. 4, the wireless communication system 400 includes UE 402 and UE 404 (although any number of UEs may be used). In this example, the UE 402 and the UE 404 are illustrated as smartphones (e.g., handheld touchscreen mobile computing devices connectable to one or more cellular networks), but may also comprise any mobile or non-mobile computing device configured for wireless communication.

The UE 402 and UE 404 may be configured to communicatively couple with a RAN 406. In embodiments, the RAN 406 may be NG-RAN, E-UTRAN, etc. The UE 402 and UE 404 utilize connections (or channels) (shown as connection 408 and connection 410, respectively) with the RAN 406, each of which comprises a physical communications interface. The RAN 406 can include one or more base stations, such as base station 412 and base station 414, that enable the connection 408 and connection 410.

In this example, the connection 408 and connection 410 are air interfaces to enable such communicative coupling, and may be consistent with RAT(s) used by the RAN 406, such as, for example, an LTE and/or NR.

In some embodiments, the UE 402 and UE 404 may also directly exchange communication data via a sidelink interface 416. The UE 404 is shown to be configured to access an access point (shown as AP 418) via connection 420. By way of example, the connection 420 can comprise a local wireless connection, such as a connection consistent with any IEEE 802.11 protocol, wherein the AP 418 may comprise a Wi-Fi® router. In this example, the AP 418 may be connected to another network (for example, the Internet) without going through a CN 424.

In embodiments, the UE 402 and UE 404 can be configured to communicate using orthogonal frequency division multiplexing (OFDM) communication signals with each other or with the base station 412 and/or the base station 414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 412 or base station 414 may be implemented as one or more software entities running on server computers as part of a virtual network. In addition, or in other embodiments, the base station 412 or base station 414 may be configured to communicate with one another via interface 422. In embodiments where the wireless communication system 400 is an LTE system (e.g., when the CN 424 is an EPC), the interface 422 may be an X2 interface. The X2 interface may be defined between two or more base stations (e.g., two or more eNBs and the like) that connect to an EPC, and/or between two eNBs connecting to the EPC. In embodiments where the wireless communication system 400 is an NR system (e.g., when CN 424 is a 5GC), the interface 422 may be an Xn interface. The Xn interface is defined between two or more base stations (e.g., two or more gNBs and the like) that connect to 5GC, between a base station 412 (e.g., a gNB) connecting to 5GC and an eNB, and/or between two eNBs connecting to 5GC (e.g., CN 424).

The RAN 406 is shown to be communicatively coupled to the CN 424. The CN 424 may comprise one or more network elements 426, which are configured to offer various data and telecommunications services to customers/subscribers (e.g., users of UE 402 and UE 404) who are connected to the CN 424 via the RAN 406. The components of the CN 424 may be implemented in one physical device or separate physical devices including components to read and execute instructions from a machine-readable or computer-readable medium (e.g., a non-transitory machine-readable storage medium).

In embodiments, the CN 424 may be an EPC, and the RAN 406 may be connected with the CN 424 via an S1 interface 428. In embodiments, the S1 interface 428 may be split into two parts, an S1 user plane (S1-U) interface, which carries traffic data between the base station 412 or base station 414 and a serving gateway (S-GW), and the S1-MME interface, which is a signaling interface between the base station 412 or base station 414 and mobility management entities (MMEs).

In embodiments, the CN 424 may be a 5GC, and the RAN 406 may be connected with the CN 424 via an NG interface 428. In embodiments, the NG interface 428 may be split into two parts, an NG user plane (NG-U) interface, which carries traffic data between the base station 412 or base station 414 and a user plane function (UPF), and the S1 control plane (NG-C) interface, which is a signaling interface between the base station 412 or base station 414 and access and mobility management functions (AMFs).

Generally, an application server 430 may be an element offering applications that use internet protocol (IP) bearer resources with the CN 424 (e.g., packet switched data services). The application server 430 can also be configured to support one or more communication services (e.g., VoIP sessions, group communication sessions, etc.) for the UE 402 and UE 404 via the CN 424. The application server 430 may communicate with the CN 424 through an IP communications interface 432.

Figure 5:
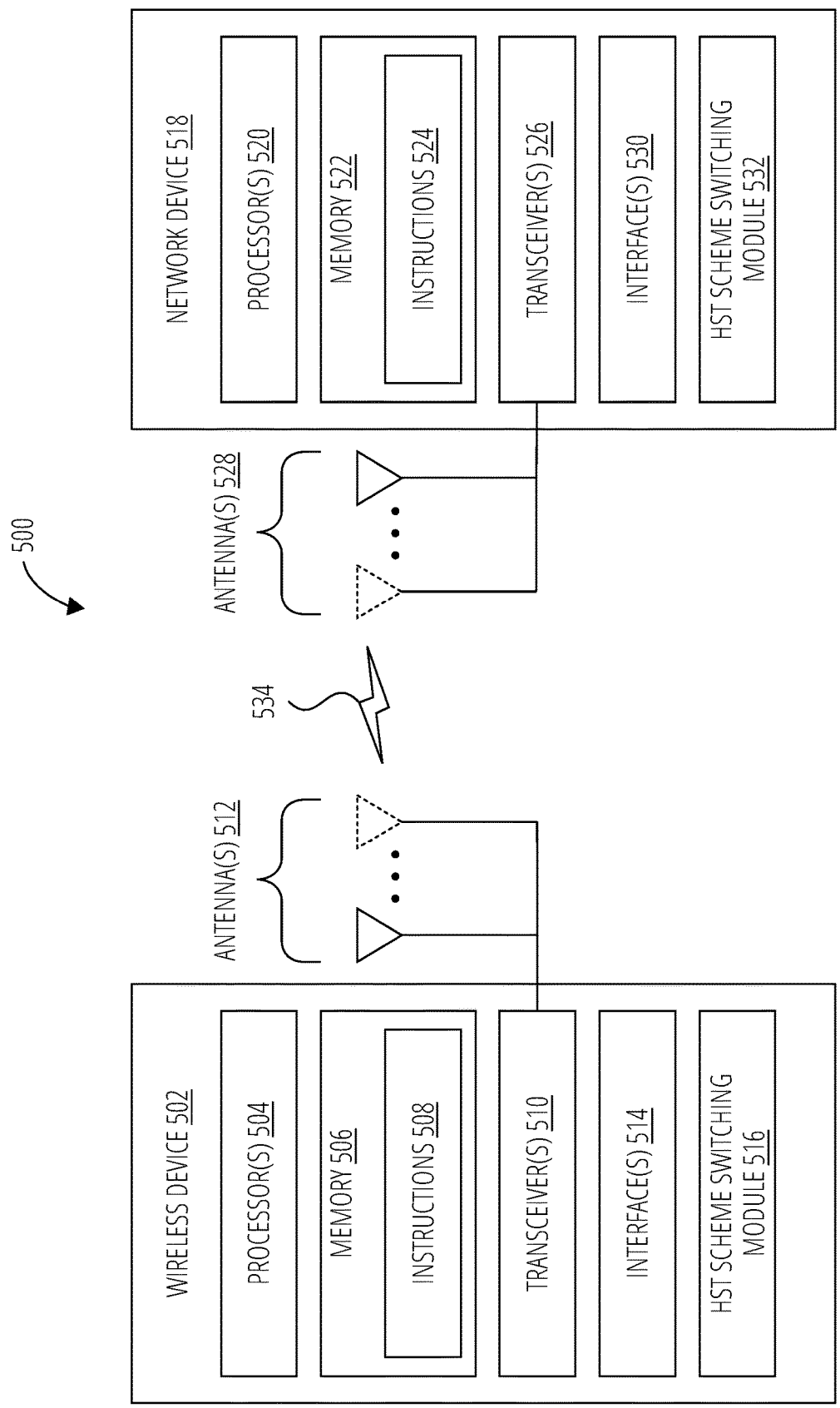
FIG. 5 illustrates a system for performing signaling between a wireless device and a network device, according to embodiments disclosed herein.

FIG. 5 illustrates a system 500 for performing signaling 534 between a wireless device 502 and a network device 518, according to embodiments disclosed herein. The system 500 may be a portion of a wireless communications system as herein described. The wireless device 502 may be, for example, a UE of a wireless communication system. The network device 518 may be, for example, a base station (e.g., an eNB or a gNB) of a wireless communication system.

The wireless device 502 may include one or more processor(s) 504. The processor(s) 504 may execute instructions such that various operations of the wireless device 502 are performed, as described herein. The processor(s) 504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 502 may include a memory 506. The memory 506 may be a non-transitory computer-readable storage medium that stores instructions 508 (which may include, for example, the instructions being executed by the processor(s) 504). The instructions 508 may also be referred to as program code or a computer program. The memory 506 may also store data used by, and results computed by, the processor(s) 504.

The wireless device 502 may include one or more transceiver(s) 510 that may include radio frequency (RF) transmitter and/or receiver circuitry that use the antenna(s) 512 of the wireless device 502 to facilitate signaling (e.g., the signaling 534) to and/or from the wireless device 502 with other devices (e.g., the network device 518) according to corresponding RATs.

The wireless device 502 may include one or more antenna(s) 512 (e.g., one, two, four, or more). For embodiments with multiple antenna(s) 512, the wireless device 502 may leverage the spatial diversity of such multiple antenna(s) 512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 502 may be accomplished according to precoding (or digital beamforming) that is applied at the wireless device 502 that multiplexes the data streams across the antenna(s) 512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 502 may implement analog beamforming techniques, whereby phases of the signals sent by the antenna(s) 512 are relatively adjusted such that the (joint) transmission of the antenna(s) 512 can be directed (this is sometimes referred to as beam steering).

The wireless device 502 may include one or more interface(s) 514. The interface(s) 514 may be used to provide input to or output from the wireless device 502. For example, a wireless device 502 that is a UE may include interface(s) 514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 510/antenna(s) 512 already described) that allow for communication between the UE and other devices and may operate according to known protocols (e.g., Wi-Fi®, Bluetooth®, and the like).

The wireless device 502 may include a HST scheme switching module 516. The HST scheme switching module 516 may be implemented via hardware, software, or combinations thereof. For example, the HST scheme switching module 516 may be implemented as a processor, circuit, and/or instructions 508 stored in the memory 506 and executed by the processor(s) 504. In some examples, the HST scheme switching module 516 may be integrated within the processor(s) 504 and/or the transceiver(s) 510. For example, the HST scheme switching module 516 may be implemented by a combination of software components (e.g., executed by a DSP or a general processor) and hardware components (e.g., logic gates and circuitry) within the processor(s) 504 or the transceiver(s) 510.

The HST scheme switching module 516 may be used for various aspects of the present disclosure, for example, aspects of FIGS. 1-3. The HST scheme switching module 516 is configured to assist in limiting scheme switching within an HST environment.

The network device 518 may include one or more processor(s) 520. The processor(s) 520 may execute instructions such that various operations of the network device 518 are performed, as described herein. The processor(s) 504 may include one or more baseband processors implemented using, for example, a CPU, a DSP, an ASIC, a controller, an FPGA device, another hardware device, a firmware device, or any combination thereof configured to perform the operations described herein.

The network device 518 may include a memory 522. The memory 522 may be a non-transitory computer-readable storage medium that stores instructions 524 (which may include, for example, the instructions being executed by the processor(s) 520). The instructions 524 may also be referred to as program code or a computer program. The memory 522 may also store data used by, and results computed by, the processor(s) 520.

The network device 518 may include one or more transceiver(s) 526 that may include RF transmitter and/or receiver circuitry that use the antenna(s) 528 of the network device 518 to facilitate signaling (e.g., the signaling 534) to and/or from the network device 518 with other devices (e.g., the wireless device 502) according to corresponding RATs.

The network device 518 may include one or more antenna(s) 528 (e.g., one, two, four, or more). In embodiments having multiple antenna(s) 528, the network device 518 may perform MIMO, digital beamforming, analog beamforming, beam steering, etc., as has been described.

The network device 518 may include one or more interface(s) 530. The interface(s) 530 may be used to provide input to or output from the network device 518. For example, a network device 518 that is a base station may include interface(s) 530 made up of transmitters, receivers, and other circuitry (e.g., other than the transceiver(s) 526/antenna(s) 528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 518 may include a HST scheme switching module 532. The HST scheme switching module 532 may be implemented via hardware, software, or combinations thereof. For example, the HST scheme switching module 532 may be implemented as a processor, circuit, and/or instructions 524 stored in the memory 522 and executed by the processor(s) 520. In some examples, the HST scheme switching module 532 may be integrated within the processor(s) 520 and/or the transceiver(s) 526. For example, the HST scheme switching module 532 may be implemented by a combination of software components (e.g., executed by a DSP or a general processor) and hardware components (e.g., logic gates and circuitry) within the processor(s) 520 or the transceiver(s) 526.

The HST scheme switching module 532 may be used for various aspects of the present disclosure, for example, aspects of FIGS. 1-3. The HST scheme switching module 532 is configured to assist a UE in configuring schemes within an HST environment.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for supporting high speed train (HST) schemes at a user equipment (UE), comprising:
in response to being within range of a transmission and reception point (TRP) of a plurality of TRPs associated with an HST, decoding a communication received from a network, the communication including an HST scheme configuration, the HST scheme configuration including an HST-single frequency network (HST-SFN) without network pre-compensation scheme and an HST-SFN with network pre-compensation scheme;
identifying at least one of a channel restriction and an environmental restriction associated with the HST scheme configuration; and
based on the at least one of the channel restriction and the environmental restriction, applying the HST scheme configuration, wherein applying the HST scheme configuration includes the UE being limited to operating in either the HST-SFN without network pre-compensation scheme or the HST-SFN with network pre-compensation scheme with respect to the environmental restriction.

2. The method of claim 1, wherein the environmental restriction comprises one of:
each component carrier (CC) of a plurality of CCs associated with the UE,
each bandwidth part (BWP) of a plurality of BWPs associated with a first CC of the plurality of CCs, or
a particular BWP of the plurality of BWPs.

3. The method of claim 2, wherein the channel restriction includes the HST scheme configuration being associated only with physical downlink shared channel (PDSCH) communications.

4. The method of claim 2, wherein the channel restriction includes the HST scheme configuration being associated only with control resource sets (CORESETs) of physical downlink control channel (PDCCH) communications.

5. The method of claim 2, wherein the channel restriction includes the HST scheme configuration being associated with physical downlink shared channel (PDSCH) communications and physical downlink control channel (PDCCH) communications.

6. A method for supporting high speed train (HST) schemes at a user equipment (UE), comprising:
in response to being within range of a transmission and reception point (TRP) of a plurality of TRPs associated with an HST, decoding a communication received from a network, the communication including a scheme configuration, the scheme configuration including an HST-single frequency network (HST-SFN) without network pre-compensation scheme, an HST-SFN with network pre-compensation scheme, and a single-TRP scheme;
identifying at least one of a channel restriction and an environmental restriction associated with the scheme configuration; and
based on the at least one of the channel restriction and the environmental restriction, applying the scheme configuration, wherein applying the scheme configuration includes the UE being limited to operating in only one of the HST-SFN without network pre-compensation scheme, the HST-SFN with network pre-compensation scheme, or the single-TRP scheme with respect to the environmental restriction.

7. The method of claim 6, wherein the environmental restriction comprises one of:
each component carrier (CC) of a plurality of CCs associated with the UE,
each bandwidth part (BWP) of a plurality of BWPs associated with a first CC of the plurality of CCs, or
a particular BWP of the plurality of BWPs.

8. The method of claim 7, wherein the channel restriction includes the scheme configuration being associated only with physical downlink shared channel (PDSCH) communications.

9. The method of claim 7, wherein the channel restriction includes the scheme configuration being associated only with control resource sets (CORESETs) of physical downlink control channel (PDCCH) communications.

10. The method of claim 7, wherein the channel restriction includes the scheme configuration being associated with physical downlink shared channel (PDSCH) communications and physical downlink control channel (PDCCH) communications.

11. A method for supporting high speed train (HST) schemes at a user equipment (UE), comprising:
in response to being within range of a transmission and reception point (TRP) of a plurality of TRPs associated with an HST, decoding a communication received from a network, the communication including a scheme configuration, the scheme configuration including an HST-single frequency network (HST-SFN) without network pre-compensation scheme, an HST-SFN with network pre-compensation scheme, and a single-downlink control information (single-DCI) multi-TRP scheme;
identifying at least one of a channel restriction and an environmental restriction associated with the scheme configuration; and
based on the at least one of the channel restriction and the environmental restriction, applying the scheme configuration, wherein applying the scheme configuration includes the UE being limited to operating in either the HST-SFN without network pre-compensation scheme or the HST-SFN with network pre-compensation scheme.

12. The method of claim 11, wherein the channel restriction includes the scheme configuration being associated only with control resource sets (CORESETs) of physical downlink control channel (PDCCH) communications.

13. The method of claim 11, wherein the channel restriction includes the scheme configuration being associated only with physical downlink shared channel (PDSCH) communications.

* * * * *